INVENTOR.
JACKSON L. CAMPBELL
BY
Kwis, Hudson, Boughton & Williams
ATTORNEYS

Dec. 18, 1956   J. L. CAMPBELL   2,774,102
BEAD SETTING METHOD AND APPARATUS
Filed April 15, 1946   5 Sheets-Sheet 4

FIG. 7

INVENTOR.
JACKSON L. CAMPBELL
BY
Kwis, Hudson, Boughton & Williams
ATTORNEYS

United States Patent Office 2,774,102
Patented Dec. 18, 1956

2,774,102
BEAD SETTING METHOD AND APPARATUS

Jackson L. Campbell, Cleveland, Ohio, assignor, by mesne assignments, to General Electric Company, a corporation of New York Application April 15, 1946, Serial No. 662,373

15 Claims. (Cl. 18—1)

This invention relates to a method and apparatus for embedding spherical objects in a surface of material and, while not limited thereto, is particularly useful for embedding small glass beads in the surface of a sheet of ductile metal.

In recent years a relatively large demand has developed for thin sheets of metal provided with closely spaced small spherical objects attached to one surface thereof. For example, there is a demand for a laminated sheet of magnesium, silver foil, and silver chloride having an overall thickness in the order of .021" provided with small closely spaced glass beads on one surface of the sheet. These beads have a diameter of approximately .025" and must be firmly embedded in the surface of one lamination of the laminated material without penetrating that lamination which may have a thickness of approximately .010". In addition to these and equally exacting requirements for similar products, the rate of production must be high and the cost relatively low.

It is, therefore, an object of this invention to provide a method and apparatus for rapidly and economically affixing spherical objects in the surface of material.

Another object of the invention is to provide a method and apparatus for rapidly and economically embedding small spherical objects in the surface of a sheet of material in a definite pattern and to a predetermined accurately controlled depth.

Another object of the invention is to provide a method for affixing small spherical objects in the surface of material in a definite pattern by spacing said objects to correspond with the desired pattern, successively pressing said spaced objects into the said surface to form craters therein, and extruding the material around each object into contact with a portion of the periphery thereof so as to grip and retain the spherical objects in their craters.

A further object of the invention is to provide an apparatus for rapidly arranging spherical objects into a predetermined pattern and embedding said arranged spherical objects into the surface of material to a predetermined depth.

A still further object of the invention is to provide an apparatus comprising a roll with a plurality of openings in its circumference arranged in a definite pattern, means to supply spherical objects to the circumference of the roll, means to retain one of such spherical objects in each opening, and means cooperating with the roll to enable the latter to embed the said spherical objects carried by the roll into a sheet of material as the said roll is rotated.

An additional object of the invention is to provide an apparatus for embedding spherical objects into the surface of a sheet of material wherein the sheet of material is passed between two rolls, one of which is provided with a plurality of spaced openings and material extruding dies so constructed and arranged that the spherical objects are positioned and retained in the said openings until they contact the said sheet whereupon the rolls press the objects into the said sheet of material and the dies extrude a portion of the material of the sheet around each of the objects to locate them in the surface of the said sheet.

A further additional object of the invention is to provide an apparatus of the type mentioned in the preceding objects with vacuum means to position and retain the spherical objects in the openings of the roll until the said objects have contacted the sheet of material in which they are to be embedded, and fluid pressure means for cooperation with the said openings, after contact of the objects with the sheet, to assist in removing the said objects from the openings.

It is also an object of the invention to provide an apparatus of the type mentioned in the preceding objects with means to adjust the depth of penetration of the objects into the surface of the material.

It is likewise an object of the invention to provide an apparatus of the character described in the preceding objects with means to rotate the roll, having the openings for the spherical objects, past a continuous source of supply of said spherical objects and a means to remove the excess spherical objects from the circumference of the roll, whereby each opening will receive one of the said spherical objects, and any surplus objects clinging to the surface of the roll will be removed.

The invention may be briefly summarized as comprising a method and an apparatus for effecting a continuous embedment of spherical objects in spaced relationship in the surface of material; the invention being hereinafter described with reference to the accompanying sheets of drawings in which.

It is believed that this invention will be more readily understood by first describing the method before entering upon the detailed description of one embodiment of an apparatus suitable for performing this method.

Broadly stated, the method consists in providing a supply of small spherical objects, withdrawing some of these objects from the supply thereof, arranging the withdrawn objects in a predetermined pattern, transferring the said arranged objects into contact with the surface of the material in which they are to be affixed, pressing the said spherical objects into the surface of the material, and extruding a portion of the material around a part of the periphery of each object so that the said objects are located in small self-formed craters in the surface of the material in the same pattern as that in which they were previously arranged. Preferably, the method is continuous so that as new ones of the spherical objects are withdrawn from the supply and arranged in the pattern, those previously so arranged are brought into contact with the surface of the material and embedded therein. One way in which this method may be practiced is to provide a bin or hopper for the spherical objects or glass beads, with the outlet of the hopper positioned to feed the beads into contact with the circumference of a continuously rotating roll provided with a plurality of openings, each surrounded by a material extruding die, the roll passing over and firmly contacting a sheet of material in which the spherical objects are to be embedded. Hence, as the roll rotates, it will continuously receive a supply of glass beads or spherical objects in the openings (thus arranging the beads in a definite pattern), and thereafter press the said objects into the surface of the sheet of material as the roll continues to rotate. This pressing of the spherical objects into the material causes the said objects to create small individual craters in the surface of the said material and the material extruding dies surrounding each object will extrude the lips of these craters around and in firm contact with a portion of the periphery of each spherical object, thus locking it in place. Obviously, the method is not dependent upon the use of a perforated roll with material extruding dies surrounding each of the spherical object receiving openings in the roll. For example, the beads or other spherical objects could be manually positioned in a predetermined pattern on a bar, plate, or other pressure member having recesses or other means for retaining the beads in their arranged positions. The said pressure member with the beads thereon would then be moved into contact with the surface of the material and pressure exerted therebetween to force the beads into the material. Also, the dies for extruding the material about the beads need not be a part of the body on which the said beads are arranged in their predetermined pattern, since the extrusion may be a separate operation performed after the beads have already been pressed into the surface of the material. Other means for performing the method of this invention will be apparent to, or could be readily devised by one skilled in the art. However, for the purpose of simplifying the disclosure only, the present preferred embodiment of an apparatus for effecting the method is illustrated in the drawings.

This apparatus includes a supporting framework 10 constructed from structural steel or other suitable materials. In the present preferred embodiment, the major elements of the framework are angle bars which are bolted or otherwise secured together to form an upright supporting framework of a rectangular cross-section. Thus, two pairs of spaced, vertically extending angle bars 11 and 12 form the forward and rear corners, respectively, and are the major vertical supports of the apparatus. The lower ends of the vertical supports 11 and 12 are connected by suitable fastening means, such as nuts and bolts 13 and drive pins 14 to flanged base members 15. These flanged base members are adapted to engage the floor or other supporting surface for the apparatus. The tops of the angle bars 11 and 12 on each side of the framework 10 are joined by a horizontally extending member 16 connected to the said vertical supports 11 and 12 by suitable fastening means such as welding, bolting, riveting or the like.

Attached to the rear flanges of the rear corners 12 of the framework are plates or pads 17 which are secured thereto by suitable fastening means such as bolts 18 and drive pins 18a. Similar plates or pads 19 are connected by suitable fastening means, such as nuts and bolts 20 and pins 20a, to the front flanges of the forward corners 11. These pads or plates 17 and 19 are disposed an equal distance above the base of the apparatus and are adapted to adjustably support a pair of angle bars 21 (one on each side of the machine) extending between the forward and rear corners of the framework 10. These angle bars or members 21 are adjustably mounted on the said pads 17 and 19 by means of the angle bars 22 and 23 whose top flanges are connected to the rear and forward edges of said members 21 by bolts 24 and 25, respectively. The side flanges of the angle bars 22, 23 extend transversely between the two rear and the two forward corners of the machine, respectively, and are adjustably connected to the aforementioned pads 17 and 19, respectively. For example, a bolt or bolts 26 may pass through each of the said rear corner members 12, pads 17, and the vertical flange of member 22, the latter having enlarged holes or slots through which the said bolts 26 extend. Also, adjusting screws or bolts 27 are threaded in corresponding openings of each of the corner members 12 and the pad or plates 17. The forward end of each bolt 27 is tapered and fitted under the lower edge of the vertical flange 22 so that when the said bolts 27 are moved inwardly the flanged member 22 will be raised by the camming action effected between the said tapered surface of bolts 27 and the lower surface of the vertical flanged member 22. Similarly, when the bolts 27 are retracted, the said angle angle member 22 will be lowered as the lower edge of the vertical flange follows the taper on the bolt 27. A lock nut 28 and suitable lock washer 29 are provided upon each of the adjusting bolts 27 to lock it in an adjusted position corresponding to a desired elevation of the angle bar 22. Likewise, a bolt 26a passes through each of the front corner members 11, pads 19, and the vertical flange of member 23, the latter having enlarged holes or slots through which the said bolts 26a extend. Also, an adjusting bolt 30, lock nut 31 and lock washer 32 are provided upon each of the forward members 11 to adjust the vertical elevation of the flanged bar or support 23 in the manner previously described for the equivalent bar 22. There is thus provided a means to vary the position of the two bars 21 so that these may be raised or lowered as desired to effect a variation in the depth of penetration of spherical objects within the surface of the material, as will be hereinafter described.

Supported upon each of the horizontally extending bars 21 are pillow bearings 33, each of which is adapted to receive one end of a shaft 34. Intermediate the ends of the shaft 34 is mounted a large smooth surface drum or roll 35 which acts as a rotating anvil member in the apparatus. The roll 35 is either integral with the shaft 34 or suitably connected thereto for rotation therewith. The horizontal position of the pillow bearings 33 may be adjusted by a pair of bolts 36 and 37 threaded in and extending through the pads 17 and 19, respectively on each side of the apparatus. The inner ends of the said bolts 36 and 37 engage the ends of the pillow bearings 33 so that as one of the bolts 36, 37 is threaded inwardly, and the other outwardly, the pillow bearing 33, together with its shaft 34 and roll 35, will be correspondingly shifted in a horizontal direction within the framework 10. Each of the bolts 36 and 37 is provided with a suitable lock nut 38 and lock washer 39 to retain the said bolts 36 and 37 in their adjusted positions. This adjustment together with that effected by the bolts 27 and 30 provides the necessary adjustments for accurately aligning the said roll 35 within the apparatus.

Spaced below the top of the corner members 11 and 12 of the framework 10 is a second pair of horizontally extending bars 40 similar to those previously designated and described as 21. The instant bars 40 extend between the forward and rear corner members 11 and 12, respectively, and are connected thereto by suitable angle plates 41, nuts and bolts 42 and/or drive pins 43, with pads or plates 44 inserted between the vertical corner members 11 and 12 in the same manner as explained for the pads 17 and 19. The angle bars 41 extend between the two front and two rear corners 11 and 12, respectively, and, in addition to supporting the bars 40, also reinforce the structure at this point. Upon the top of the two members 40 on each side of the machine is mounted a pillow bearing 45, each of which may be adjusted laterally within the framework 10 by adjusting bolts 46 and 47 in the same manner as previously described for the operation of the bolts 36 and 37 upon the pillow bearings 33.

Journalled within each of the pillow bearings 45 is a stub shaft 48, the inner ends of which are connected to, or formed integrally with a roll 49. This roll 49 constitutes a pressure member forming an essential part of the invention and is so constructed and arranged as to provide a means for retaining a plurality of spherical objects in a spaced, predetermined pattern until the said objects have contacted a sheet of material and are about to be pressed therein, whereupon a means becomes operative to expel the spherical objects from the openings.

Turning now to Figs. 3 to 9, it will be seen that this upper roll or pressure member 49 is constructed from a plurality of circular plates or discs 50, each of which has the same diameter, corresponding to the diameter of the roll 49. The end faces of the adjacent plates or discs 50 have counter-bored recesses 51 and cooperating bosses 52 which interfit (see Fig. 3) to provide for accurate assembly of the said plates or discs into a single unitary roll. Adjacent the outer circumference of the roll are one or more longitudinally extending bores 53 in which are disposed dowels 54 to accurately align and help connect the said plates together. Only one of these said aligned bores 53 and dowels 54 appear in Fig. 3. It will, however, be apparent that it is desirable to provide two or more sets of these bores and dowel pins. To further assist in connecting the plates or discs 50 and holding them together as a unitary roll, each of the said discs or plates 50 is additionally provided with a plurality of transversely extending holes 55 which are closely in alignment and through each of which a bolt 56 is passed. A nut 57 is then threaded upon one end of each bolt 56 and cooperates with the head 58 at the other end of the bolt in clamping the plates or discs 50 tightly together so as to form the unitary roll 49.

The assembly of roll 49 from a plurality of plates or discs 50 enables the length of the roll to be readily adapted to a desired size of apparatus and also facilitates the forming of various bores and openings therein. The plates 50 may all be the same thickness or may have different thicknesses if a greater variety of lengths of roll 49 are desired.

Figures 8, 9, 10, 11:
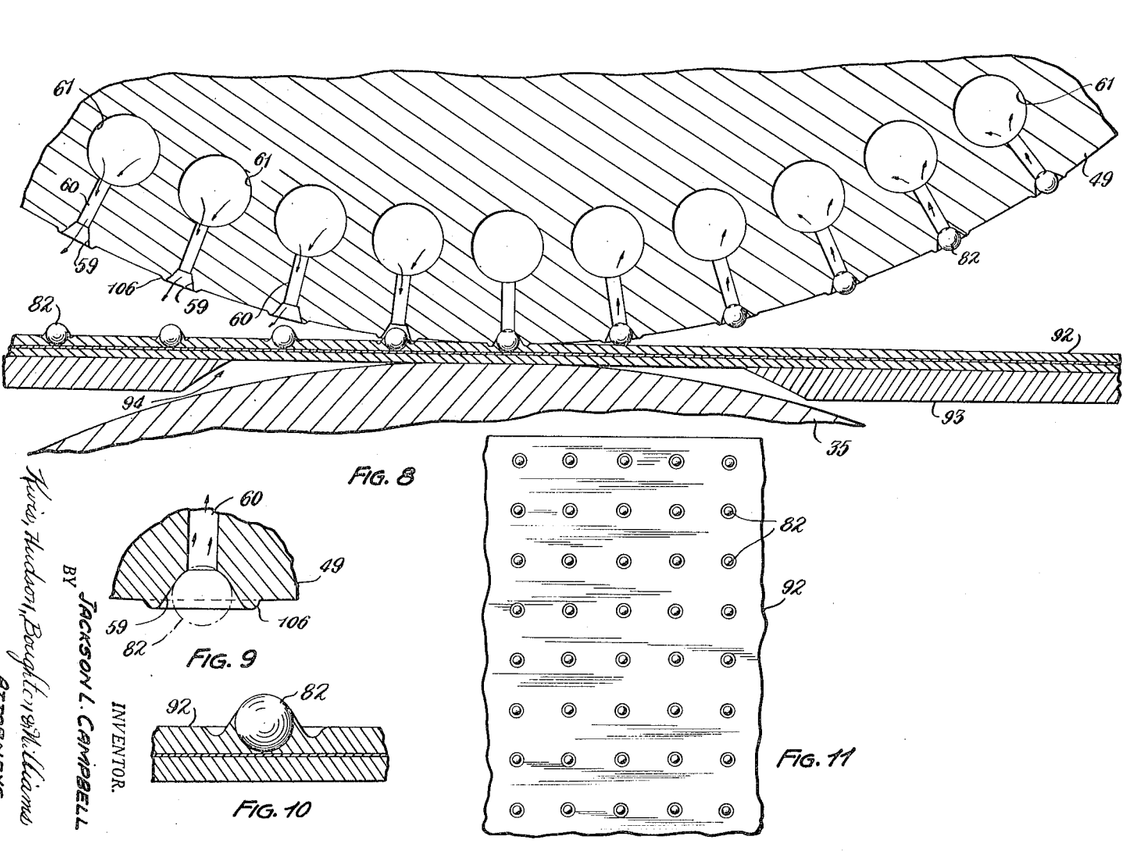
Fig. 8 is a sectional view (on an enlarged scale) through a portion of the rolls and the material supporting table with a portion of a sheet of material shown between the rolls to illustrate the operate of the upper roll in embedding the spherical objects into the sheet of material.
Fig. 9 is a fragmentary sectional view (on an enlarged scale) of a portion of the upper roll illustrating one of the spherical object receiving openings and the surrounding material extruding die surface.
Fig. 10 is a sectional view (on an enlarged scale) through a portion of a sheet of laminated material showing the manner in which one of the spherical objects is embedded in the top lamination and the material thereof extruded around the object to retain it in place.
Fig. 11 is a plan view of a portion of a piece of material (on an enlarged scale) with the spherical objects embedded therein, the objects being arranged in a pattern comprised of columns and rows.

The periphery of the roll 49 is perforated by a large number of openings 59, shown on an enlarged scale in Figs. 8 and 9. These openings are closely spaced in a definite pattern which may consist of rows and columns or have any other desired configuration. The said openings have a size such that they will each receive a small spherical object so that the periphery of said spherical object is slightly beyond the outer periphery of roll 49 (see Figs. 8 and 9). Each of the openings 59 is connected by a short, radially extending bore 60 to a transversely extending bore 61 so that each row of openings 59 in any one row across the width of the roll 49 is connected to one such transversely extending bore 61, the ends of which are open.

At each end of the roll 49 is mounted a stationary manifold 64 provided with a journal 63 in which the stub shaft 48 for the corresponding end of the roll 49 is rotatably received. These manifolds 64 have their inner faces in sliding contact with the side faces of the roll 49, and the said faces of the manifold and roll are accurately machined to prevent leakage of air therebetween. In addition, suitable sealing means may be provided at these points, if desired, to further reduce leakage. Each of the manifolds 64 is provided with corresponding grooves and passages for alternately establishing communication between the bores or passages 61 in the roll and suitable sources of vacuum or fluid pressure.

Figure 1:
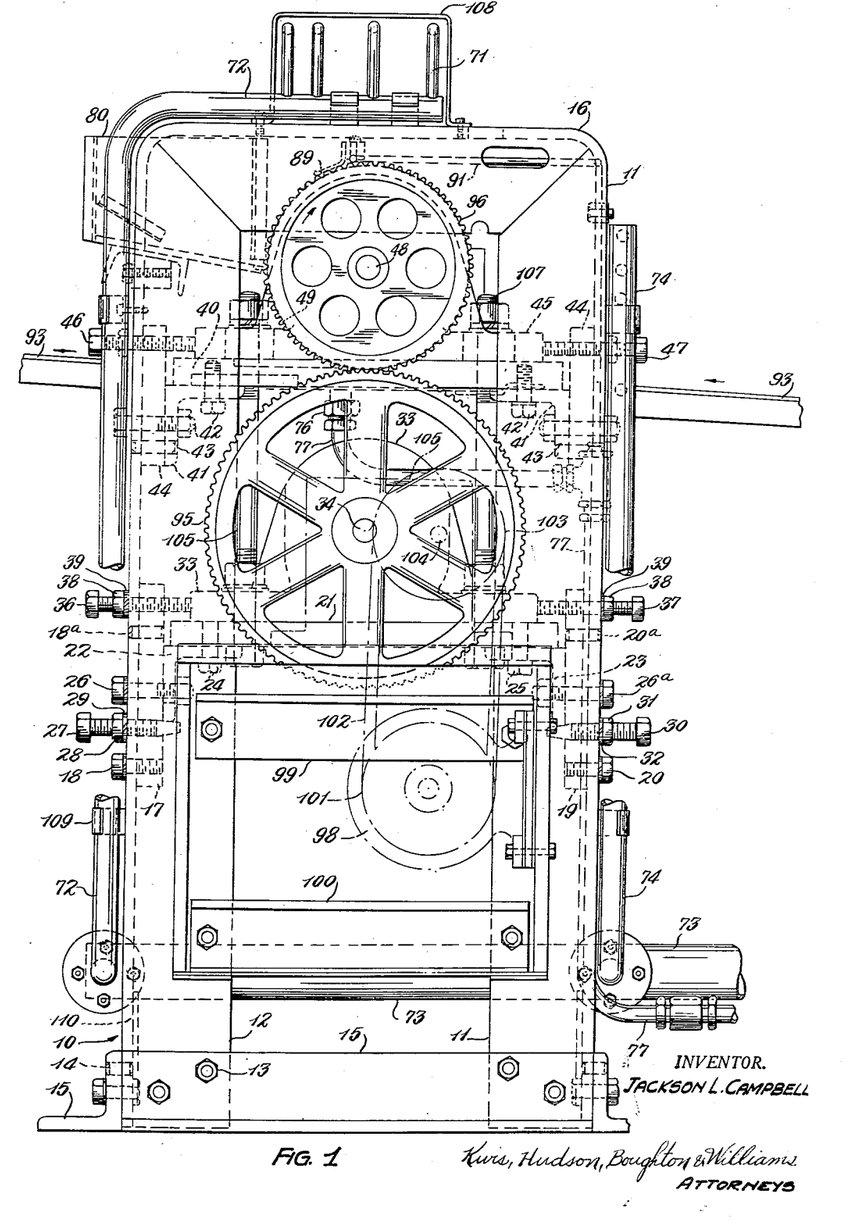
Fig. 1 is a side elevational view of one embodiment of the apparatus of my invention with the housings for the gears removed.
Figure 2:
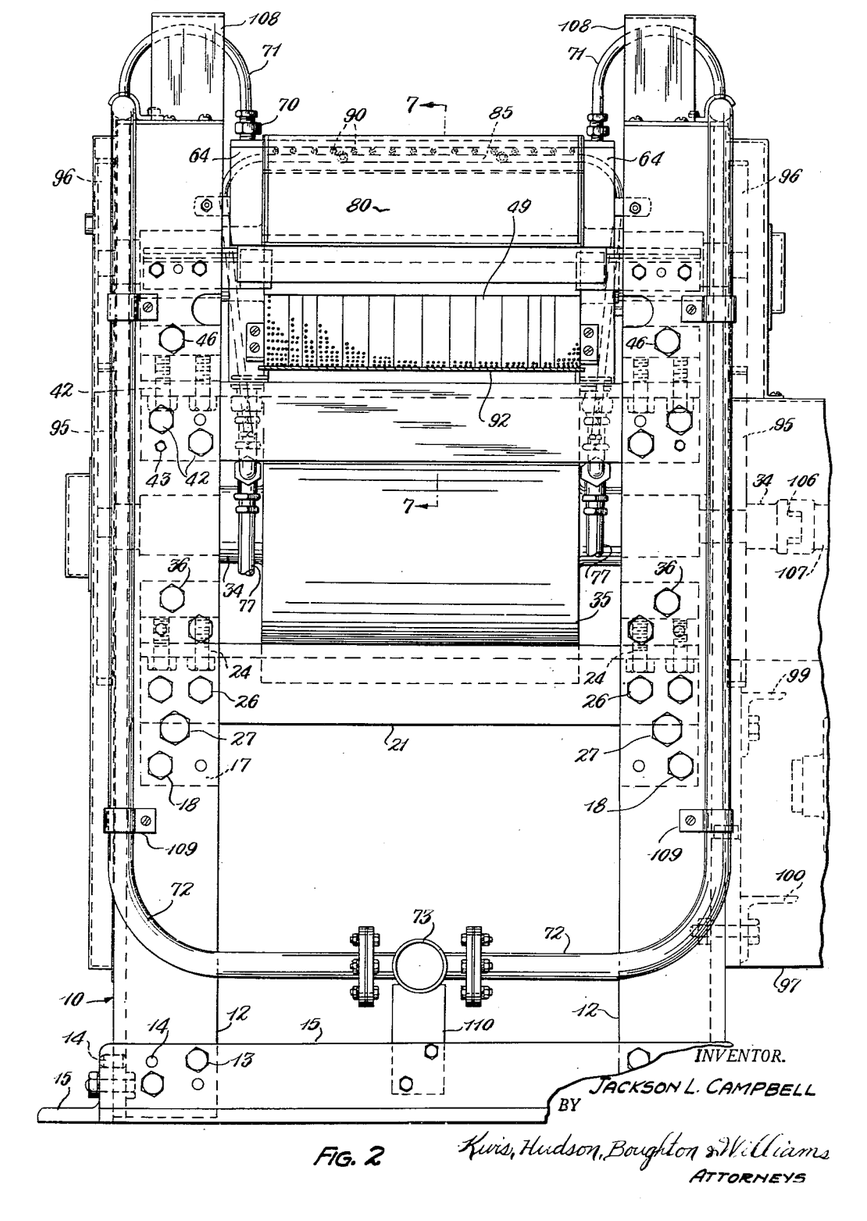
Fig. 2 is an elevational view of the back or delivery end of the apparatus of Fig. 1, the view being taken from the left of Fig. 1.
Figure 3:
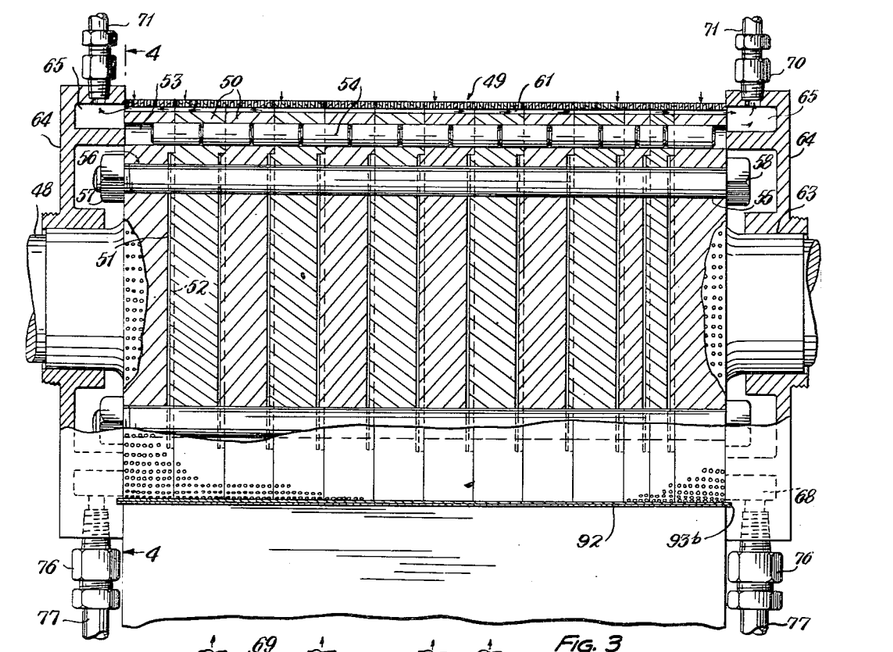
Fig. 3 is a front elevational view of the spherical object setting roll and the manifolds therefor with a portion of the said roll and manifolds broken away on a longitudinal section thereof to more clearly reveal the construction.
Figure 4:
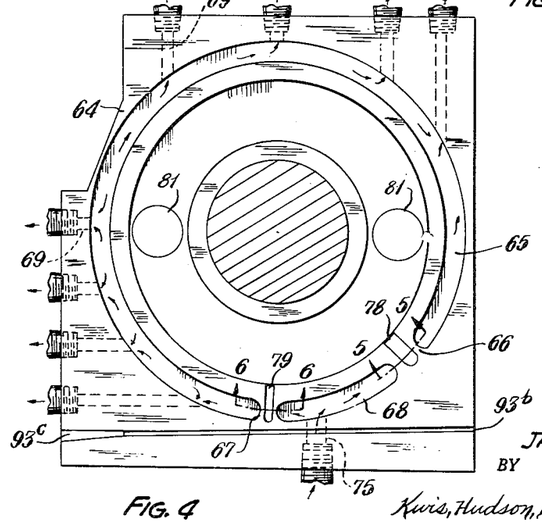
Fig. 4 is a front elevational view of one of the vacuum and pressure manifolds for the upper roll, the view being taken substantially on the line 4—4 of Fig. 3, and looking in the direction indicated by the arrows.
Figure 5:
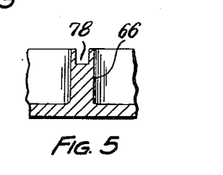
Fig. 5 is a sectional view of a portion of one of the manifolds, the section being taken on line 5—5 of Fig. 4 and looking in the direction indicated by the arrows.
Figure 6:
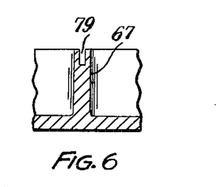
Fig. 6 is a sectional view of another portion of one of the manifolds, the section being taken on line 6—6 of Fig. 4 and looking in the direction indicated by the arrows.
Figure 7:
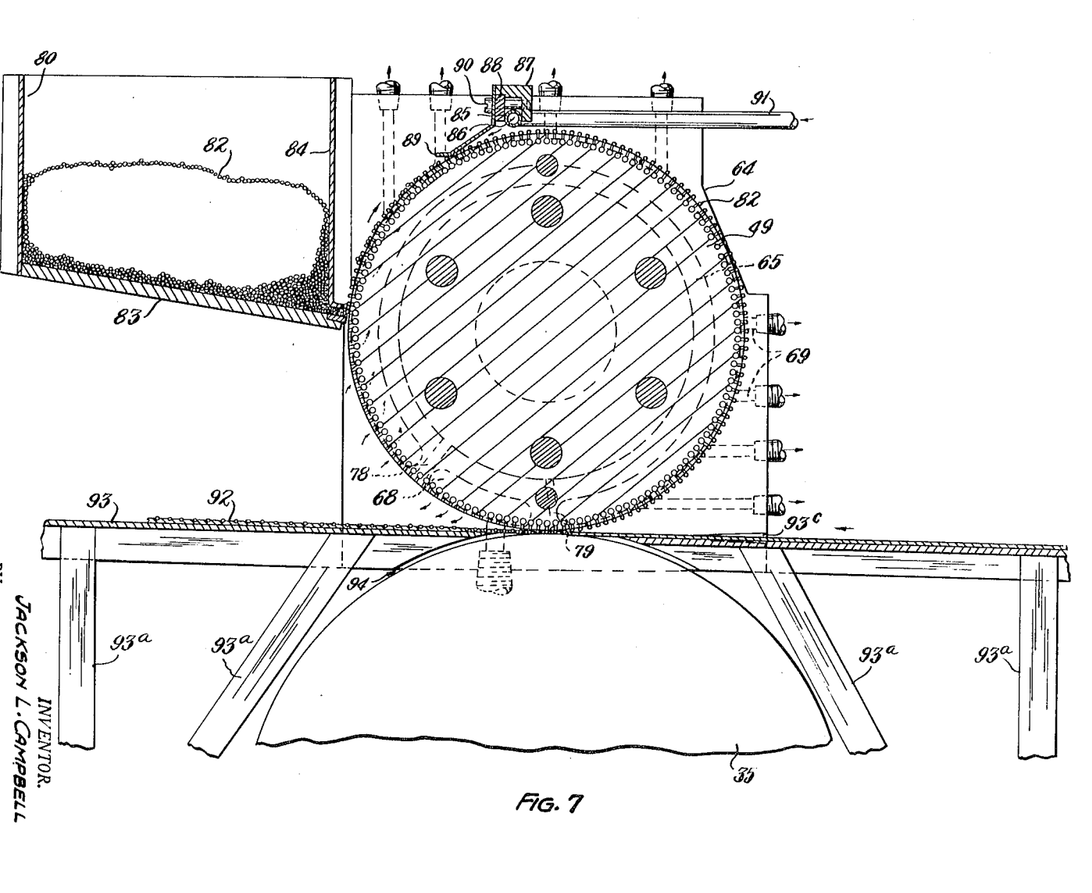
Fig. 7 is a transverse section of the top portion of the apparatus, the section being taken on the line 7—7 of Fig. 2 with the supporting framework removed.

The internal construction of each of the manifolds 64 will be apparent from inspection of the Figs. 3, 4, 5 and 6. As shown in Figs. 3 and 4, an arcuate groove or recess 65 extends around the inner face of each manifold, the said groove or recess 65 having a diameter such as to permit registration thereof with the outer end of the passages 61 through the roll 49. This groove or recess 65 does not form a complete circle but is interrupted by flange or rib portions 66 and 67 is another recess 68, which is also arcuate and has the same radius as that of the previously mentioned recess 65 so that the two recesses 65 and 68 are almost continuous, being interrupted only by the aforementioned flanges or ribs 67 and 68.

Adjacent the top of each manifold 64 are a plurality of bores 69, communicating with the recess or groove 65, and adapted to receive unions 70 for connection to the fluid conduits 71. In the particular installation shown, there are four such passageways 69 and conduits 71 at the top and four more at the side of each of the manifolds 64, with the inner ends of the bores 69 spaced about the recess or groove 65 so as to effect a more uniform pressure distribution within the said recess or groove 65 than would be effected if only one bore 69 and conduit 71 were employed. The individual conduits 71 at the top of the manifolds 64 are connected to the larger conduits 72 extending along the corner posts 12 and top 16 of each side of the machine. A rectangular guard 108 is connected to each of the transverse top member 16 of the framework 10 and extends above the said conduits 71 to protect the latter. Suitable clamps 109 retain the conduit 72 against the vertical frame members 12. The lower ends of conduits 72 are connected with a horizontally extending duct or conduit 73, which is in turn connected to a source of vacuum which is not shown but may be a suitable vacuum pump or other conventional means. Also connected to the conduit or duct 73 is a vertically extending conduit 74, which has its upper end connected with the conduits 71 which are in communication with the bores 69 at the sides of the manifolds 64. Support for the conduit 73 is provided by a pair of plates 110 bolted or otherwise secured to the base flanged members 15, and conduits 74 are retained against the vertical supports 11 by suitable clamps 109.

The recess or groove 68 in each manifold 64 is in communication with a bore 75 extending through the lower end of the manifold and threaded to receive a suitable union 76 for connection with a fluid conduit 77. Conduit 77 is connected to a source of fluid pressure which is not shown but which may be a compression pump or similar device for supplying air or other gas under pressure. The flange or rib 66 between the recesses 65 and 68 in the manifolds 64 is provided with a shallow recess 78, which is in communication with the hollow interior of the manifolds 64. Likewise, the flange or rib 67 is provided with a shallow recess 79 communicating with the hollow interior of the manifolds 64. Each manifold 64 is provided with one or more holes 81 communicating its hollow interior with the atmosphere. The operation of the manifold in conjunction with the bores 61, ducts 60 and openings 59 in the roll 49 is as follows.

As the roll 49 is rotated, the ends of the openings 61 will successively communicate with the groove or recess 65 during the major portion of the revolution of the roll so that a vacuum is applied from the conduits 71 and the recess 65 to the said passageway 61 and thereby to the openings 59. As the roll 49 continues to rotate, the openings 61 will successively pass adjacent the flange or rib 67 so that communication with the vacuum maintained in groove 65 will be interrupted. Each opening or bore 61 will then progressively pass and communicate with the recess 79 in the flange 67, which is in free communication with the atmosphere through the hollow interior of the manifolds 64 and the holes 81. The pressure within the openings 59 and bores 60, which are in communication with the passageway or bore 61 in registry with the recess 79, will therefore become atmospheric until continued rotation of the roll 49 brings the said opening 61 into communication with the recess 68, within which is maintained air or other gas at a pressure greater than atmospheric by means of the conduit 77. Continued rotation of the roll 49 will then bring each bore 61 adjacent the flange or rib 66. This discontinues the application of fluid pressure to bores 61, 60 and openings 59 and the pressure therein will return to atmospheric as each bore 61 comes opposite the passage 78, which is in communication with the outside atmosphere through the hollow interior of the manifolds 64 and the openings 81. Continued rotation of the roll 49 will again bring each of the bores 61 successively into communication with the recess 65 to again establish a vacuum therein, and this cycle is continuously repeated during each revolution of the roll 49.

In the upper portion of the framework 10 is mounted a hopper 80, within which is contained a supply of glass beads 82 or other spherical objects, which are to be impressed in a sheet of material. The bottom 83 of the hopper 80 slopes towards the front wall 84 thereof and an opening is provided between the said front wall 84 and bottom 83 so that a thin layer of the beads or other spherical objects may flow therebetween. The said hopper has a width substantially that of the framework 10, and the opening between the front and lower walls 84, 83 extends across the entire width of the roll 49, and closely adjacent thereto, so that the beads or other spherical objects 82 will be fed in a narrow band against the entire length of the drum 49 as it rotates therepast.

As described above, the manifolds 64 at each end of the roll have their vacuum grooves 65 so disposed that the bores 61 of the roll 49 are subjected to a vacuum as they approach and continue past the opening at the lower end of the hopper 80. This vacuum within the passages or bores 61 tends to draw air through the openings 59 and the bores 60 of the roll 49 so that as each opening 59 comes adjacent the discharge opening of the bin 80, one of the spherical objects 82 will be drawn into and retained within each of the said openings 59. The said spherical objects then seal the bore 60 from further entrance of air therein (see Fig. 9).

Due to the fact that the beads or spherical objects 82 employed have a very small diameter, it has been found that surplus beads tend to cling to the surface of the roll 49 between the said openings 59. In order to remove these surplus beads 82, a conduit 85 is provided adjacent the top of the roll 49. This conduit 85 extends the entire width of roll 49 and has a narrow slot 86 through its lower side directed towards the periphery of the roll 49. The conduit 85 is supported by an angle member 87 extending across, and suitably supported upon, the apparatus with the vertical flange of member 87 engaging one side of the said conduit 85. A bar or plate 88 extends along the other side of the said conduit 85, and on the forward face of this bar 88 is disposed a shield 89. The said shield 89 and bar 88 have a plurality of openings therein for receiving screws 90, which have their ends threaded into the vertical flange of the angle member 87 so that the bar 88 and shield 89 are clamped to the said angle bar 87 with the conduit 85 held between the vertical flange of the angle member 87 and the rear side of the plate 88. The shield 89 extends the entire width of the roll 49 and is bent downwardly towards the roll 49 so that the lower end of the shield is spaced above the roll 49 just far enough to provide clearance for those spherical objects 82 which are carried by the roll 49 and properly positioned within the openings 59 thereof.

Fluid pressure is supplied to the conduit 85 by one or more conduits 91, which are in turn connected with the conduit 77 connected to the source of fluid pressure. Hence, a continuous stream of air or other gas flows through the conduits 91 and 85, out of the slot 86 and through the restricted space defined by the periphery of the roll 49 and the shield 89. This provides a steady stream of air under pressure on the top surface of the roll 49 adjacent the lower end of the shield 86 and tangentially of the roll at this point so that the surplus beads or spherical object 82 clinging to the roll 49, but not received in the openings 59, will be dislodged. These dislodged beads or spherical objects may be collected in a bin, tray or other receptacle, not shown, and returned to the hopper 80.

Turning now to Figs. 1, 2, 7 and 8, it will be seen that the rolls 35 and 49 which have been described as mounted in bearings for rotation are parallel and have their peripheries slightly spaced from each other a distance sufficient to accommodate a sheet of material 92 therebetween in intimate contact with both of said rolls. A suitable table or other supporting surface 93 is provided adjacent the forward and rear ends of the apparatus, and supported by the legs or brackets 93a attached to the framework 10, to guide the said sheet of material to and between the said rolls 35 and 49. This table 93 has an opening 94 therein, through which a portion of the lower roll 35 projects to contact the lower surface of the sheet of material 92. To further guide the edges of the material in its passage through the machine, the lower faces of the manifolds 64 are each provided with transversely extending slots 93b (see Figs. 3, 4 and 7). The entrance to these slots 93b is slightly enlarged as at 93c to assist in guiding the material into the said slots. For the purpose of clarity of disclosure, the portion of table 93 adjacent the roll 35 have been omitted in Fig. 1, but are shown in section in Figs. 7 and 8.

The shaft 34 for the roll 35 has extensions beyond the pillow bearings 33, and upon these extensions of the shaft 34 are mounted spur gears 95 connected for rotation with the said shaft and roll. In like manner, a portion of the stub shafts 48 for the roll 49 extends beyond the pillow bearings 45, and connected on these extensions of shafts 48 are spur gears 96, which are continuously in mesh with the gears 95 connected with shaft 34 for the roll 35. Suitable covers or housings for these gears are connected to the framework 10. Also connected to the framework 10, on the side thereof but disposed at a point below the said gears 95, is mounted a suitable housing and support 97, within which is disposed an electric motor 98. The said housing 97 may be supported in any desired manner upon the framework 10 as, for example, by means of angle bars 99 and 100 connected with the said housing 97 and to the vertically extending corner supports 11 and 12 of the framework 10. The motor 98 is provided with a pulley or gear 101, which is connected by a belt or chain 102 to a corresponding pulley or gear 103 on the input shaft 104 of a gear reduction unit 105 mounted upon the framework 10 adjacent to the shaft 34. The shaft 34 is extended beyond one of the gears 95 and is provided with a coupling 106 for connection to the output shaft 107 of the gear reduction unit 105.

Thus, there is provided a continuous drive from the motor 98 through the gear reduction unit 105 to the shaft 34, thus rotating roll 35 and, through gears 95 and 96, the upper roll 49. Hence, when a sheet of material 92 is placed upon the table 93 with the forward edge of the sheet inserted between the rolls 35 and 49, the rolls will grip the said sheet 92 and move it therebetween, with the result that the beads or other spherical objects 82, carried in the openings 59 of the roll 49, will be pressed into the top surface of the said sheet 92.

It will be noted that the vacuum groove 65 in the manifolds 64 extend to a point almost vertically above the point of contact between the roll 49 and the top surface of the sheet 92 so that the said beads or spherical objects 82 are positively retained within the openings 59 until such time as they are in a position to be forced into a sheet of material 92. However, at the moment the beads 82 contact the surface of the sheet 92, the roll 49 will have moved the corresponding bore 61 for that row of beads 82 out of registry with the vacuum groove 65 of the manifolds 64 and into registry with the atmosphere through the recess 79 in the flange or rib 67 of the manifolds so that the said beads are no longer held within the openings 59 by vacuum. Hence, as the roll 49 advances and presses the spherical objects 82 into the top surface of the sheet 92, there will be no vacuum above the beads tending to withdraw them from the said sheet as the roll continues to rotate. As the said roll further advances the bores 61 corresponding to the openings 59, which are in contact with the sheet 92, will have been moved to cooperate with the recess 68 in the manifolds 64 so that fluid pressure in the said recesses 68 is exerted upon the said bores 61 and openings 59, thus assisting the separation of the beads 82 from the roll 49. Continued rotation of the roll 49 carries the bores 61 thereof into registry with the recess 78 in the flange or rib 66, thus releasing the fluid pressure therein and returning it to atmospheric pressure. Further rotation of the roll 49 again brings the bores 61 thereof into registry with the vacuum recess 65 so that a suction is produced at the openings 59 as they pass by the opening in the hopper 80, thus assisting the positioning of the beads 82 within the said openings, as previously mentioned.

The aforementioned recesses 78 and 79 in the flanges or ribs 66 and 67 of the manifolds 64 are not absolutely essential to the functioning of the device but improve the operation by returning the pressure within the bores 61 to atmospheric pressure between each communication with the vacuum or pressure recesses 65 and 68 respectively, thus enabling vacuum or pressure to be more quickly established in the said bores 61. Also, if there should be any leakage at the ends of the recesses 65 and 68, the said recesses 78 and 79 conduct this leakage to the atmosphere and prevent a direct transfer of the respective pressure conditions between the pressure and vacuum recesses 65 and 68.

The surface of the drum 49 adjacent and surrounding each of the openings 59 is formed as substantially crater-shaped, material extruding dies 106. The dies may be formed integrally upon the surface of the drum 49 or may be separate members welded or otherwise attached to said drum. The function of these dies 106 is to engage and extrude the surface of the material of sheet 92 about the craters formed by each of the beads 82 as it is pressed into the said surface of the material 92. It will be noted that the outer edge of the openings 59 adjacent the dies 106 is flared slightly so that a space is provided between a portion of the periphery of the beads 82 and the said openings 59. The material extruded by the dies 106 will flow into this space so that the material of the sheet 92 will be locked about a substantial portion of the periphery of the beads 82 in the manner illustrated on a greatly enlarged scale in Fig. 10. The spacing of the beads upon the sheet of material will be apparent from Fig. 11, which illustrates a portion of the resulting sheet with the glass beads embedded therein after it has passed between the rolls 35 and 49.

In order to prevent the bearings for the rolls 35 and 49 from springing relative to each other during the passage of the sheet of material therebetween, vertical bolts or rods 107 are connected between the angle bars 21 and 40, with the said bolts or rods 107 also passing through the bases of pillow bearings 33 and 45. Suitable nuts and washers are threaded upon the said bolts or rods 107 to retain the desired spacing between the pillow bearings 33 and 45 and rolls 35 and 49 which determines the depth of penetration of the beads or spherical objects 32 in the surface of the material 92. This spacing (and hence the depth of penetration of the beads) may be adjusted by loosening the nuts upon the vertical rods 107 and by loosening the clamping bolts 26 and 26a holding the angle brackets 22 and 23 which support the angle bar 21 for the pillow bearings 33. The adjusting bolts 27 and 30 may then be moved either inwardly or outwardly the amount necessary to raise or lower the said angle bars 22 and 23 carrying the pillow bearings 33, which in turn supports the roll 35. When the desired spacing between the rolls 35 and 49 has been secured, the clamping bolts 26 and 26a are tightened and the nuts on the rods or shafts 107 are also tightened to maintain this adjusted position. As previously mentioned, the rolls 35 and 49 may be laterally adjusted by operation of the adjusting screws 36, 37 and 46, 47 respectively.

It is believed that the construction of the apparatus will be readily apparent from the preceding detailed description. However, to coordinate the functioning of the several instrumentalities comprising the apparatus the operation as a whole may be summarized as follows. A supply of glass beads or other small spherical objects 82 are placed in hopper 80 and the motor 98 is started, thus causing rotation of the rolls 35 and 49. As the roll 49 moves past the opening between the bottom 83 and the front wall 84 of the hopper 80, the glass beads or spherical objects 82 will be received in the openings 59 in the surface of the roll 49 and retained therein by the vacuum created within the openings 59 through their communication, by the bores 60 and 61, with the vacuum groove 65 in the manifolds 64. Surplus beads (i. e., those which are not received within the pockets or openings 59 but which are clinging to the surface of the roll 49) will be removed by the blast of air emanating from the slit 86 in the conduit 85 and directed tangentially of the roll 49 by the shield 89. There is thus provided a definite pattern of beads 82 in rows and columns upon the circumference of the drum 49; and, since the said beads are retained within the openings or pockets 59 by vacuum, they will be carried by the roll 49 as it rotates until they contact a sheet of material 92, which is fed steadily on the table 93 until it is between the rolls 35 and 49.

Continued rotation of the rolls will move the sheet 92 therebetween and press the beads 82 into the top surface of the said sheet. At approximately the moment of contact of the beads with the sheet of material, the communication between the pockets or openings 59 and the vacuum grooves 65 in the manifolds is interrupted and the said openings 59 are placed in communication with the atmosphere for a brief interval of time. Continued rotation of the rolls establishes communication of the pockets 59 with the source of fluid under pressure through the grooves 68 in the manifolds, and this fluid pressure assists the mechanical pressure exerted by the rolls 35 and 49 in pressing the said glass beads 82 into the top surface of the material 92 so that each bead forms a crater in the said material. Simultaneously, the dies 106 surrounding the openings 59 extrude the lips of the craters around and into contact with the surface of the beads 82 to firmly lock them into the top surface of the material 92 so that the resulting sheet has the appearance as shown in Fig. 11, with each individual bead embedded therein in the manner indicated in detail in Fig. 10. Hence, the said beads form a definite pattern (for example, a pattern of rows and columns) upon the surface of the material 92 identical with that which they occupied while upon the roll 49.

As the roll 49 continues to rotate, the pockets 59, which had been previously emptied by the impression of their beads into the surface of the material again pass in front of the discharge opening of the hopper 80 and receive a new supply of beads, and this operation continues so long as beads are supplied to the hopper 80 and material is fed to the rolls 35 and 49.

While I have disclosed a preferred embodiment of an apparatus effective to perform the described method of embedding glass beads in the surface of a sheet of material, it will be apparent that the method may be performed by other and different apparatuses and that the apparatus disclosed may be modified without substantially changing its operation. For example, it is not essential that the anvil member provided below the material (as it is fed through the machine) be a roll such as 35. Substantially the same result would be obtained if a flat plate (which could be a portion of the table 93) were provided in accurately spaced relationship to the roll or pressure member 49 for supporting the material during the embedding of the objects 82 therein. Also, as previously described, it is not essential that the dies 106 be integral parts of the surface of the drum, since these dies may be separately constructed and welded or otherwise secured to the surface of the drum around the openings 59. Furthermore, while the drum has been disclosed as constructed from a plurality of separate plates joined together, this construction is provided primarily to afford ease in adjusting the width of the roll for the particular installation. Obviously, this roll could be formed as one integral piece or of a greater or less number of separate plates if so desired.

In view of these and numerous other modifications which may be made by one skilled in the art, I wish it understood that I do not consider my invention as limited to the exact details of the procedural steps or the apparatus construction herein described and illustrated but desire to cover all changes and modifications coming within the spirit and scope of my invention as defined in the appended claims.

Having thus described my invention, I claim:

1. The method of embedding spherical objects in the surface of imperforate areas of a material comprising the steps of, providing a plurality of crater-shaped material extruding dies, positioning a single one of said spherical objects in each of said dies, pressing said dies and objects into the surface of said imperforate areas of the material with sufficient force to produce craters in the surface of said material and extrude a portion of the material around and in contact with a portion of the periphery of each spherical object, and thereafter removing said dies from contact with said material and said spherical objects so as to leave the latter embedded in the craters and held by the said extruded portions of the material.

2. The process of affixing spherical objects in spaced relationship on imperforate areas of a sheet of material comprising the steps of, providing a plurality of crater-shaped material extruding dies spaced to correspond with the desired spacing of the objects on the sheet of material, positioning a single one of said spherical objects in each of said dies, sequentially moving said dies and objects into contact with imperforate areas of the surface of said sheet of material with sufficient force to produce craters in the surface of the said sheet and extrude the material at the lips of said craters outwardly around and in contact with a portion of the periphery of each spherical object, and thereafter sequentially removing said dies from contact with said sheet of material and said spherical objects so as to leave the latter embedded in the said craters and held by the said extruded lips.

3. The method of embedding spherical objects in the surface of imperforate areas of a material comprising the steps of, providing an anvil member and a cooperating pressure member, the surface of the pressure member having a plurality of spaced openings therein each surrounded by a material extruding die, supplying spherical objects to the said surface of the pressure member, applying a vacuum to each of the openings in the pressure member to position and temporarily retain one of said spherical objects in each of said openings, inserting a piece of material between said anvil member and said pressure member, and moving the said pressure member in a manner to exert pressure upon said piece of material and said anvil member by the said objects and the said surface of the pressure member thereby forcing the spherical objects in the said openings into the surface of the imperforate areas of said piece of material and extruding a portion of the material around and into contact with a portion of the perihery of each of said spherical objects.

4. An apparatus of the character described comprising, an anvil member, a pressure member having a surface thereof adapted to cooperate with said anvil member to receive and exert pressure upon a piece of material therebetween, the surface of the pressure member having a plurality of spaced openings therein, a material extruding die surrounding each of said openings and carried by said pressure member, means to supply a plurality of spherical objects to the surface of the pressure member, means cooperating with the said pressure member to apply a vacuum to said openings so that one of said spherical objects will be positioned in and retained in each of said openings, and means to move said pressure member relative to said anvil member to exert pressure upon a piece of material inserted therebetween so that the spherical objects in the openings of the pressure member are pressed into a surface of the said piece of material, and the die surrounding each of the openings extrudes a portion of the material around and into contact with a portion of the periphery of the corresponding spherical objects.

5. An apparatus of the character described comprising, a supporting framework, a roll journalled in said framework, said roll having a plurality of spaced openings in the circumference thereof, a plurality of material extruding dies on the circumference of the roll, there being one of said dies surrounding each of said openings, means for supplying a plurality of spherical objects to the circumference of said roll, means cooperating with the openings in said roll to retain one of said spherical objects in each of said openings during a portion of each revolution of the roll, means cooperating with said roll and adapted to support a sheet of material in intimate contact with a portion of the circumference of the roll, and means to rotate said roll, whereby a sheet of material presented to said roll and the means cooperating with the circumference thereof will be moved therebetween by the rotation of said roll, so that the spherical objects carried by the roll will be pressed into a surface of the said sheet of material, and the die surrounding each opening in the roll will extrude a portion of the material of the sheet around and into contact with a portion of the periphery of the corresponding spherical object.

6. An apparatus as defined in claim 5 and wherein the means cooperating with the openings in said roll to retain the spherical objects therein comprises a source of vacuum and means to connect said source of vacuum to said openings during a portion of each revolution of said roll.

7. An apparatus as defined in claim 6 and further comprising means adjacent the circumference of said roll to remove therefrom the surplus spherical objects supplied thereto and which are not received in said openings.

8. An apparatus of the character described comprising, a supporting framework, a roll journalled in said framework, said roll having a plurality of spaced openings in the circumference thereof, the surface of the roll around each opening being formed as a material extruding die, means for supplying a plurality of spherical objects to the circumference of said roll, means cooperating with the openings in said roll to retain one of said spherical objects in each of said openings during a portion of each revolution of the roll, means cooperating with the said openings during a different portion of each revolution of the roll to expel the said spherical objects from the openings, means cooperating with a portion of the circumference of said roll and adapted to support a sheet of material in intimate contact therewith, and means to rotate said roll, the apparatus being so constructed and arranged that, when a sheet of material is presented to said roll and the mean cooperating with the circumference thereof, the said sheet will be moved therebetween by the rotation of said roll so that the spherical objects carried by the roll will be pressed into a surface of the said sheet, and the die surrounding each opening in the roll will extrude a portion of the material of the sheet around and into contact with a portion of the periphery of the corresponding spherical object.

9. An apparatus as defined in claim 8 wherein the means cooperating with the openings in the roll to retain the spherical objects therein comprises, a source of vacuum and means to connect said source of vacuum to said openings during a portion of each revolution of the roll, and wherein the means to expel the said spherical objects from the said openings comprises, a source of fluid pressure and means to connect said source of fluid pressure to said openings during a different portion of each revolution of the roll.

10. An apparatus as defined in claim 8 and further comprising means adjacent the circumference of the roll for removing therefrom the surplus spherical objects which are not received in said openings.

11. An apparatus of the character described comprising a pair of rolls adapted to receive and exert pressure upon a sheet of material inserted therebetween, one of said rolls having a plurality of spaced openings in the circumference thereof, a material extruding die surrounding each of said openings and carried by the circumference of the said one of the rolls, means to supply a plurality of spherical objects to the circumference of the said one of the rolls, means cooperating with the said openings to position and retain one of the spherical objects in each of said openings during a portion of each revolution of said one of the rolls, and means to rotate said rolls, whereby a sheet of material presented to said rolls will be moved therebetween and the spherical objects carried by the said one of the rolls will be pressed into the surface of the said sheet, and the die surrounding each opening will extrude a portion of the material of the sheet around and into contact with a portion of the periphery of the corresponding spherical object.

12. An apparatus of the character described comprising, a supporting framework, a pair of substantially parallel rolls journalled in said framework with their circumferences spaced sufficiently to receive and contact a sheet of material therebetween, one of said rolls having a plurality of spaced openings in the circumference thereof, a plurality of material extruding dies on the circumference of said one of the rolls, there being one of said dies surrounding each of said openings, means for supplying a plurality of spherical objects to the circumference of the said one of the rolls, means cooperating with the openings in the said one of the rolls to retain one of said spherical objects in each of said openings during a portion of each revolution of said roll, and means to rotate said rolls, whereby a sheet of material presented to said rolls will be moved therebetween by the rotation of the rolls so that the spherical objects carried by the said one of the rolls will be pressed into the surface of the said sheet, and the die surrounding each opening in the said one of the rolls will extrude a portion of the material of the sheet around and into contact with a portion of the periphery of the corresponding spherical object.

13. An apparatus of the character described comprising, a supporting framework, a pair of substantially parallel rolls journalled in said framework with their circumferences spaced sufficiently to receive and contact a sheet of material therebetween, one of said rolls having a plurality of spaced openings in the circumference thereof, the surface of the said one of the rolls around each opening being formed as a material extruding die, means for feeding a plurality of spherical objects to the circumference of the said one of the rolls, means cooperating with the openings in the said one of the rolls to retain one of said spherical objects in each of said openings during a portion of each recolution of the said one of the rolls, means cooperating with the said openings during a different portion of each revolution of the said one of the rolls to expel the said spherical objects from the openings, and means to rotate said rolls, whereby a sheet of material presented to said rolls will be moved therebetween by the rotation thereof so that the spherical objects carried by the said one of the rolls will be pressed into the surface of the said sheet, and the die surrounding each opening in the said one of the rolls will extrude a portion of the material of the sheet around and into contact with a portion of the periphery of the corresponding spherical object.

14. An apparatus as defined in claim 13 wherein the means cooperating with the openings in the said one of the rolls to retain the spherical objects therein comprises, a source of vacuum and means to connect said source of vacuum to said openings during a portion of each revolution of the said one of the rolls, and wherein the means to expel said spherical objects from the said openings comprises, a source of fluid pressure and means to connect said source of fluid pressure to said openings during a different portion of each recolution of the rolls.

15. An apparatus as defined in claim 13 and further comprising, means adjacent the circumference of the said one of the rolls for removing therefrom the surplus spherical objects which are not received in said openings, and means to adjust the said rolls relative to each other to vary the depth of embedment of the spherical objects in the sheet of material.

References Cited in the file of this patent

UNITED STATES PATENTS

| | | |
|---|---|---|
| 941,032 | McCarthy | Nov. 23, 1909 |
| 1,060,098 | Kaufmann | Apr. 29, 1913 |
| 1,331,235 | Bristow | Feb. 17, 1920 |
| 1,637,834 | Oliver | Aug. 2, 1927 |
| 1,997,500 | Swarkovski | Apr. 9, 1935 |
| 2,093,437 | Gwinn | Sept. 21, 1937 |
| 2,120,630 | Seever | June 14, 1938 |
| 2,171,193 | Rau | Aug. 29, 1939 |
| 2,181,573 | Bunker | Nov. 28, 1939 |
| 2,405,074 | Underwood | July 30, 1946 |